US008564640B2

(12) United States Patent
Jones et al.

(10) Patent No.: US 8,564,640 B2
(45) Date of Patent: Oct. 22, 2013

(54) SYSTEMS AND METHODS OF CREATING A VIRTUAL WINDOW (75) Inventors: Peter W. J. Jones, Belmont, MA (US); Dennis W. Purcell, Medford, MA (US)

(73) Assignee: Tenebraex Corporation, Boston, MA (US)

( * ) Notice: Subject to any disclaimer, the term of this patent is extended or adjusted under 35 U.S.C. 154(b) by 1006 days.

(21) Appl. No.: 12/313,274

(22) Filed: Nov. 17, 2008

(65) Prior Publication Data
US 2009/0147071 A1 Jun. 11, 2009

Related U.S. Application Data (60) Provisional application No. 61/003,350, filed on Nov. 16, 2007.

(51) Int. Cl.
H04N 7/00 (2011.01)
(52) U.S. Cl.
USPC .......................................................... 348/36
(58) Field of Classification Search
USPC .......................................................... 348/36
See application file for complete search history.

(56) References Cited

U.S. PATENT DOCUMENTS

| 3,863,207 | A | | 1/1975 | Galella |
| 4,253,083 | A | | 2/1981 | Imamura et al. |
| 4,534,650 | A | * | 8/1985 | Clerget et al. ................. 356/608 |
| 4,628,466 | A | | 12/1986 | Tymes |
| 5,103,306 | A | | 4/1992 | Weiman et al. |
| 5,416,392 | A | | 5/1995 | Lee et al. |
| 5,432,871 | A | | 7/1995 | Novik |
| 5,495,576 | A | | 2/1996 | Ritchey |
| 5,581,399 | A | * | 12/1996 | Abe ............................... 359/410 |
| 5,657,073 | A | * | 8/1997 | Henley ............................ 348/38 |
| 5,668,593 | A | | 9/1997 | Lareau et al. |
| 5,710,560 | A | | 1/1998 | Cohn |
| 5,760,826 | A | | 6/1998 | Nayar |
| 5,777,675 | A | | 7/1998 | Miida et al. |
| 5,961,571 | A | | 10/1999 | Gorr et al. |
| 6,018,349 | A | | 1/2000 | Szeliski et al. |
| 6,127,943 | A | | 10/2000 | Tauchi et al. |
| 6,144,406 | A | | 11/2000 | Girard et al. |
| 6,210,006 | B1 | | 4/2001 | Menozzi et al. |
| 6,282,330 | B1 | | 8/2001 | Yokota et al. |

(Continued)

FOREIGN PATENT DOCUMENTS

| EP | 1341383 | 9/2003 |
| JP | 2001/014591 | 1/2001 |

(Continued)

OTHER PUBLICATIONS

International Search Report for PCT/US 08/12886 dated Feb. 12, 2009.

(Continued)

*Primary Examiner* — Douglas Blair
(74) *Attorney, Agent, or Firm* — Ropes & Gray LLP (57) ABSTRACT

The systems and methods described provide an imaging system that allows multiple sensors to record images at their respective best exposures values and adaptively altering the exposure of the images recorded to create a seamless 360-degree view. In particular, the systems and methods described herein include determining exposure values for each column of photosensitive elements in a sensor by interpolating between the best exposure values of adjacent sensors.

22 Claims, 7 Drawing Sheets

(56) References Cited

U.S. PATENT DOCUMENTS

| | | |
|---|---|---|
| 6,591,008 B1 | 7/2003 | Surve et al. |
| 6,611,241 B1 | 8/2003 | Firester et al. |
| 6,650,772 B1 | 11/2003 | Inoue et al. |
| 6,679,615 B2 | 1/2004 | Spearing |
| 6,707,393 B1 | 3/2004 | Moore |
| 6,778,207 B1 | 8/2004 | Lee et al. |
| 6,781,618 B2 | 8/2004 | Beardsley |
| 6,836,287 B1 | 12/2004 | Nakahara |
| 6,851,809 B1 | 2/2005 | Sachtler et al. |
| 6,895,256 B2 | 5/2005 | Harma et al. |
| 6,977,685 B1 | 12/2005 | Acosta-Serafini et al. |
| 7,015,954 B1 | 3/2006 | Foote et al. |
| 7,072,107 B2 * | 7/2006 | Filipovich et al. ............ 359/407 |
| 7,084,904 B2 | 8/2006 | Liu et al. |
| 7,084,905 B1 | 8/2006 | Nayar et al. |
| 7,106,374 B1 | 9/2006 | Bandera et al. |
| 7,129,981 B2 | 10/2006 | Berstis |
| 7,135,672 B2 * | 11/2006 | Land .............................. 250/221 |
| 7,146,032 B2 | 12/2006 | Jung et al. |
| 7,268,803 B1 | 9/2007 | Murata et al. |
| 7,277,118 B2 | 10/2007 | Foote |
| 7,335,868 B2 * | 2/2008 | Liao et al. ...................... 250/205 |
| 7,385,626 B2 | 6/2008 | Aggarwal et al. |
| 7,450,165 B2 | 11/2008 | Ahiska |
| 7,529,424 B2 | 5/2009 | Ahiska |
| 7,688,374 B2 * | 3/2010 | Land .............................. 348/311 |
| 7,747,068 B1 | 6/2010 | Smyth et al. |
| 7,940,311 B2 * | 5/2011 | Trimeche et al. .......... 348/227.1 |
| 2001/0019363 A1 | 9/2001 | Katta et al. |
| 2002/0003573 A1 | 1/2002 | Yamaguchi et al. |
| 2002/0126914 A1 | 9/2002 | Kotake et al. |
| 2002/0141614 A1 | 10/2002 | Lin |
| 2003/0151689 A1 | 8/2003 | Murphy |
| 2004/0027451 A1 | 2/2004 | Baker |
| 2004/0086186 A1 | 5/2004 | Kyusojin et al. |
| 2004/0150641 A1 | 8/2004 | Duiker |
| 2004/0196379 A1 | 10/2004 | Chen et al. |
| 2004/0212677 A1 | 10/2004 | Uebbing |
| 2004/0247173 A1 | 12/2004 | Nielsen et al. |
| 2005/0036067 A1 | 2/2005 | Ryal et al. |
| 2005/0141607 A1 | 6/2005 | Kaplinsky |
| 2005/0206873 A1 | 9/2005 | Tanaka et al. |
| 2006/0017807 A1 | 1/2006 | Lee et al. |
| 2006/0031917 A1 | 2/2006 | Winder et al. |
| 2006/0125921 A1 | 6/2006 | Foote |
| 2006/0170614 A1 | 8/2006 | Tzong et al. |
| 2006/0187305 A1 | 8/2006 | Trivedi et al. |
| 2006/0250505 A1 | 11/2006 | Gennetten et al. |
| 2007/0159535 A1 | 7/2007 | Kumagai et al. |
| 2007/0223904 A1 | 9/2007 | Bloom et al. |
| 2009/0091645 A1 * | 4/2009 | Trimeche et al. ............. 348/273 |
| 2009/0118600 A1 | 5/2009 | Ortiz et al. |
| 2013/0050553 A1 * | 2/2013 | Bugnet et al. .................. 348/308 |

FOREIGN PATENT DOCUMENTS

| | | |
|---|---|---|
| JP | 2001094857 A | 4/2001 |
| JP | 2001320616 A | 11/2001 |
| JP | 2003141562 A | 5/2003 |
| JP | 2004072694 A | 3/2004 |
| JP | 2004328736 A | 11/2004 |
| JP | 2005051318 A | 2/2005 |
| JP | 2006173988 | 3/2006 |
| WO | WO-00/70486 | 11/2000 |
| WO | WO-02/065762 | 8/2002 |

OTHER PUBLICATIONS

Extended European Search Report for European Application No. EP 08 84 8695 mailed Jan. 21, 2011.

Nicolescu, M., et al., "GlobeAll: Panoramic Video for an Intelligent Room," *Proceedings of the International Conference on Pattern Recognition*, vol. I, pp. 823-826, Barcelona, Spain, Sep. 2000.

Niefeld, M., et al., "Projects—Camera Array Demonstrator," Distant Focus Corporation, http://www.distantfocus.com/projects/icis/. Accessed Nov. 16, 2006.

International Search Report and Written Opinion for PCT/US 09/01999 dated Mar. 20, 2012.

Office Action for Application No. 2010-534056 dated Jun. 18, 2013.
Office Action for Application No. 08848695.6 dated Jul. 18, 2013.

* cited by examiner

SYSTEMS AND METHODS OF CREATING A VIRTUAL WINDOW

REFERENCE TO RELATED APPLICATIONS

This application claims the benefit of U.S. Provisional Application Ser. No. 61/003,350 filed on Nov. 16, 2007. The teachings of the foregoing application are hereby incorporated by reference herein in their entirety.

BACKGROUND

Today, there is a great need for an inexpensive imaging system capable of providing 360-degree situational awareness. Situational awareness involves perceiving critical factors in the environment or scene. It may include the ability to identify, process, and comprehend the critical elements of information about what is happening in the scene, and comprehending what is occurring as the scene changes, or as objects in the scene move. An imaging system capable of providing situational awareness may be used in battlefield settings to get a real-time view of a combat situation or track movements in hazardous surroundings. Soldiers can use the system to better strategize patrolling routes or combat zones, minimizing casualties and damaged resources.

There is also a need for an imaging system that can enlarge a portion of the scene to clarify a suspicious object or person. The system can zoom in and send the image of a suspicious subject to a remote site for further analysis. In addition to military uses, such imaging device may be useful for security purposes for monitoring large areas such as a bus terminal or any area that requires a constant monitoring.

The imaging system may use inexpensive CCD image sensors to collect image data and store the data in a computer readable format. The system's affordability allows a variety of users to implement the system for various purposes. For example, a small business owner can install the imaging system to monitor shoplifters. A large mall may install multiple systems in the parking lot or the loading zones to monitor activities. An image system may also be installed by the main entrance door of a large apartment building to screen visitors. In some cases, small peep holes found in most doors are not sufficient to determine the identity of a person at the door. An image system may be installed at the door or in the hallway of an apartment to verify the identity of a visitor.

The low cost of these sensors and the ready availability of computer programs to process data generated from these sensors has led to a host of new applications and devices. However, as such sensor captures a separate field of view, any system that employs multiple sensors must also have a system that integrates the different fields-of-views together to create one image.

Current techniques utilize software applications to allow a user to combine a plurality of images from the plurality of sensors to create one image. Therefore, the sensors corresponding to different fields-of-view operate almost independently, and a user simply positions images obtained from each sensor adjacent to one another through the software application's graphical user interface, to form an integrated panoramic image. In most settings, these multiple sensors are exposed to a different amount of light. The amount of light exposed to a sensor is sometimes referred to as an exposure value, which relates to the brightness of an image. Without adjusting the exposure value, an under-exposed portion of an image is often too dark and the over-exposed portion is too light. For example, a combatant may want to place the imaging system in a tunnel or a dark alley to track movements or before entering the tunnel for an operation. Without adjusting the exposure, the images captured by the imaging system are too dark and difficult to understand. On the other hand, an imaging system placed in a bright spot, such as a desert combat zone, may also render images that are difficult to read from being over-exposed. In other instances, soldiers may be want to scout a complex terrain having both bright spots and dark spots such as deeply forested mountain trails. Therefore, because of different exposures of adjacent sensors, the combined image typically includes visible seams near the region of intersection of the images. Although, these seams may be partially smoothened out in the software application, such manipulation is generally accompanied by a loss of information near the seams. Therefore, what might be potentially valuable information about the scene may be lost in post-processing.

Accordingly, there is a great need for an inexpensive system that provides for a substantially seamless image depicting a 360-degree view of a scene.

SUMMARY

The systems and methods described herein address the deficiencies of the prior art by providing an improved image sensor system that allows multiple sensors to record images at their respective best exposures values and adaptively altering the exposure of the images recorded to create a seamless 360-degree view. A typical charge-coupled device (CCD) imaging sensor may consist of parallel vertical CCD shift registers, a serial horizontal CCD shift register, and a signal sensing output amplifier. During operation, sequential rows of charges in the photosensitive elements (pixels) in the vertical CCD are shifted in parallel to the horizontal CCD, where they are transferred serially as the horizontal lines of the image and read by the output amplifier. The process repeats until all rows are read out of the sensor array. The systems and methods described herein include determining exposure values for each column of photosensitive elements (pixels) in a sensor by interpolating between the best exposure values of adjacent sensors. The systems and methods described herein include a plurality of CCD imaging sensors that are rotated by 90-degrees such that the charge in each pixel is transferred column-wise until all the columns are read out. During operation, as each column is readout, the signal value or charge may be modified based on the interpolated exposure value.

More particularly, in one aspect, the systems and methods described herein include methods of imaging a scene. The methods may include disposing a first imaging sensor adjacent to a second imaging sensor. Each sensor may have an array of photosensitive elements for recording a charge in response to incident light. The methods further include determining a first exposure value for the first sensor and a second exposure value for the second sensor, receiving light from the scene at the first and second sensors, transferring charge collected at each of the photosensitive elements in the first and second sensors to a processor, and modifying the charge collected at one or more of the photosensitive elements based on first and second exposure value. The methods may include generating an image of the scene based on the modified charge.

In certain embodiments, the first imaging sensor is disposed horizontally adjacent to the second imaging sensor. In such embodiments, charge collected at each of the photosensitive elements in the first sensor are transferred column-wise to a processor beginning with a border column nearest the second sensor. Charge collected at each of the photosensitive elements in the second sensor may also be transferred column-wise to a processor beginning with a border column nearest the first sensor. In other embodiments, the first imaging sensor is disposed vertically adjacent to the second imaging sensor.

In certain embodiments, modifying the charge includes determining interpolated exposure values for each column of photosensitive elements in the first and second sensor based on the first and second exposure value, and modifying the charge based on the interpolated exposure values. Additionally and optionally, modifying the charge may include generating a signal value based on the charges from the first and second sensors and modifying the signal value based on the first and second exposure value. In such embodiments, modifying the signal value includes determining an interpolated exposure value based on the first and second exposure value, and modifying the signal value corresponding to each column based on the interpolated exposure value. In certain embodiments, the interpolated exposure value includes performing at least one of a linear, spline and cubic interpolation between the first exposure value and the second exposure value.

In another aspect, the systems and methods described herein include imaging systems. The systems may include a first imaging sensor having a plurality of photosensitive elements, a second imaging sensor having a plurality of photosensitive elements and disposed adjacent to the first imaging sensor, and an exposure circuitry for determining a first exposure value for the first imaging sensor and a second exposure value for the second imaging sensor. The systems may further include a processor configured with circuitry, for modifying the charge collected at one or more of the photosensitive elements based on first and second exposure value, and generating an image of the scene based on the modified charge.

In certain embodiments, the systems may further include a plurality of imaging sensors, each disposed adjacent to one another. In such embodiments, the plurality of imaging sensors and the first and second imaging sensors are positioned in a closed circle having a combined field-of-view of about 360 degrees. The plurality of imaging sensors and the first and second imaging sensors may be positioned in a semi-circle having a combined field-of-view of about 180 degrees.

In certain embodiments, at least one of the first and second imaging sensor includes a charge-coupled device (CCD) imaging sensor. In such embodiments, the first and the second imaging sensor are positioned horizontally adjacent to one another. The first and second imaging sensors may be oriented such that charges from the first and second sensors are transferred along vertical columns beginning with columns nearest the other one of the sensors. In other embodiments, at least one of the first and second imaging sensor includes a complimentary metal-oxide semiconductor (CMOS) imaging sensor.

In yet another aspect, the systems and methods described herein include methods of generating a digital image of a scene. The methods may include disposing a first charge-coupled device image sensor adjacent to a second charge-coupled device image sensor, each sensor having rows and columns of photosensitive elements, such that the first sensor borders the second sensor along a direction parallel to the columns of each sensor, and recording an image using the sensors. In certain embodiments, recording an image may include exposing, at a first exposure value, the first sensor to light from the scene, exposing, at a second exposure value, the second sensor to light from the scene, and determining an interpolated exposure value for the photosensitive elements in each column of each sensor based on the first and second exposure values. The methods may further include generating a signal value by transferring charge accumulated at the photosensitive elements in each sensor, column-wise to an output amplifier, modifying the signal value for each column based on the interpolated exposure value, and generating an image based corresponding to the scene based on the modified signal value.

In certain embodiments, transferring charge column-wise includes transferring, to a processor, charge from photosensitive elements in a border column on the first sensor nearest to the second sensor, and charge from photosensitive elements in a border column on the second sensor nearest to the first sensor. Transferring charge may further include transferring, to the processor, charge from the remaining columns in the first sensor sequentially away from the border column on the first sensor. In certain embodiments, transferring charge may still further include transferring, to the processor, charge from the remaining columns in the second sensor sequentially away from the border column on the second sensor.

In certain embodiments, an interpolated exposure value of the column in the first sensor, nearest to the second sensor is substantially the same as an interpolated exposure value of the column in the second sensor, nearest to the first sensor. One or more interpolated exposure values may be calculated based on a linear interpolation between the first and second exposure values. One or more interpolated exposure values may be calculated based on a spline interpolation between the first and second exposure values. In certain embodiments, at least one column in the first sensor has an exposure value equal to the first exposure value and at least one column in the second sensor has an exposure value equal to the second exposure value.

In certain embodiments, the methods may include disposing one or more additional charge-coupled device imaging sensors adjacent to at least one of the first and second sensor. In such embodiments, recording the image includes exposing the one or more additional sensor at an third exposure value and determining interpolated exposure values for columns between the one or more additional sensors and the first and second sensors based on the first, second and third exposure values.

In still another aspect, the systems and methods described herein include imaging systems. The systems may include a first charge-coupled device imaging sensor positioned adjacent to a second charge-coupled device imaging sensor, each sensor having rows and columns of photosensitive elements. The systems may further include an exposure circuitry connected to the first and second sensor and configured to determine a first exposure value for the first sensor and a second exposure value for the second sensor. The systems may include a processor, for receiving a charge from each of the photosensitive elements in the first and second sensors. In certain embodiments, the processor may include circuitry for calculating interpolated exposure values for each column of photosensitive elements on each sensor based on the first and second exposure value. The processor may be configured for receiving charges from photosensitive elements in each sensor along a first column nearest to the other one of the sensors. In certain embodiments, the processor may be configured for receiving charges from the photosensitive elements in remaining columns in each sensor along a direction away from the other sensor. The processor may be further configured for modifying the received charges based on the interpolated exposure values, and generating an image based on the modified charge.

BRIEF DESCRIPTION OF THE DRAWINGS

The foregoing and other objects and advantages of the invention will be appreciated more fully from the following further description thereof, with reference to the accompanying drawings wherein.

DETAILED DESCRIPTION

The systems and methods described herein will now be described with reference to certain illustrative embodiments. However, the invention is not to be limited to these illustrated embodiments which are provided merely for the purpose of describing the systems and methods of the invention and are not to be understood as limiting in anyway.

Figure 1:
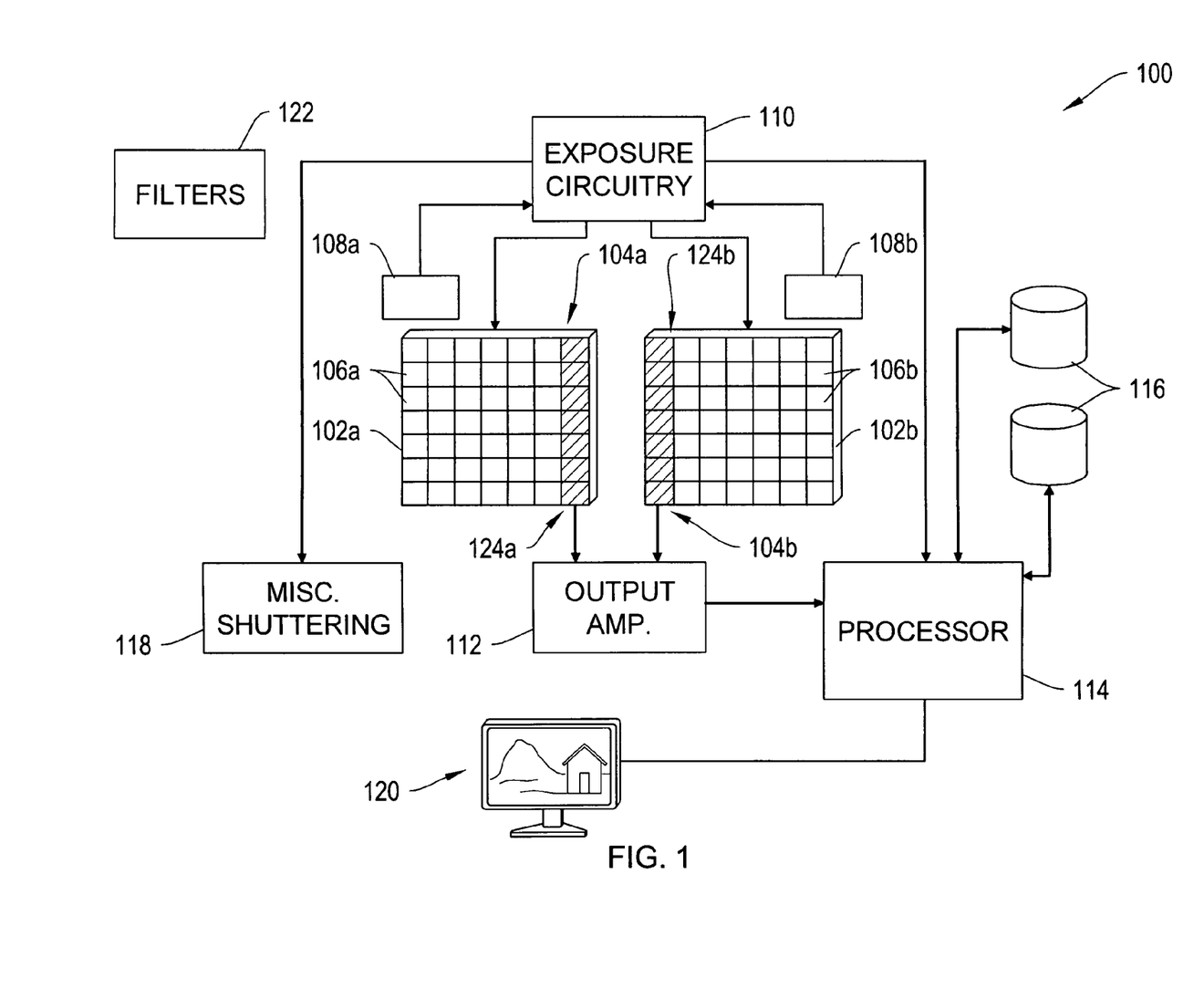
FIG. 1 depicts an imaging system having two imaging sensors, according to an illustrative embodiment of the invention.

FIG. 1 depicts an imaging system 100 having two sensors positioned adjacent to each other, according to an illustrative embodiment of the invention. In particular, system 100 includes imaging sensors 102a and 102b that are positioned adjacent to each other. Light meters 108a and 108b are connected to the sensors 102a and 102b for determining incident light on the sensors. The light meters 108a and 108b and the sensors 102a and 102b are connected to exposure circuitry 110. The exposure circuitry 110 is configured to determine a exposure value for each of the sensors 102a and 102b. In certain embodiments, the exposure circuitry 110 determines the best exposure value for a sensor for imaging a given scene. The exposure circuitry 110 is optionally connected to miscellaneous mechanical and electronic shuttering systems 118 for controlling the timing and intensity of incident light and other electromagnetic radiation on the sensors 102a and 102b. The sensors 102a and 102b may optionally be coupled with one or more filters 122.

In certain embodiments, sensor 102a includes an array of photosensitive elements (or pixels) 106a distributed in an array of rows and columns. The sensor 102a may include a charge-coupled device (CCD) imaging sensor. In certain embodiments, the sensor 102a includes a complimentary metal-oxide semiconductor (CMOS) imaging sensor. In certain embodiments, sensor 102b is similar to sensor 102a. Sensor 102b may include a CCD and/or CMOS imaging sensor. Sensors 102a and 102b may be positioned adjacent to each other. In certain embodiments, the sensors 102a and 102b may be configured to capture different fields-of-view of a scene. The sensors 102a and 102b may be angled depending on the desired extent of the field-of-view. During operation, incident light from a scene being captured may fall on the sensors 102a and 102b. In certain embodiments, the sensors 102a and 102b may be coupled to a shutter and when the shutter opens, the sensors 102a and 102b are exposed to light. The light may then converted to a charge in each of the photosensitive elements 106a and 106b.

The sensors can be of any suitable type and may include CCD image sensors. The sensors, in combination with other components in the imaging system 100, may generate a file in any format, such as the raw data, GIF, JPEG, TIFF, PBM, PGM, PPM, EPSF, X11 bitmap, Utah Raster Toolkit RLE, PDS/VICAR, Sun Rasterfile, BMP, PCX, PNG, IRIS RGB, XPM, Targa, XWD, possibly PostScript, and PM formats on workstations and terminals running the X11 Window System or any image file suitable for import into the data processing system. Additionally, the system may be employed for generating video images, including digital video images in the .AVI, .MPG formats.

In certain embodiments, once the shutter closes, light is blocked and the charge may then be transferred and transmitted and converted into an electrical signal. In such embodiments, charge from each column is transferred along the column to an output amplifier 112. Charge may first be transferred from each pixel in the columns 104a and 104b. In certain embodiments, after this is completed, charges from columns 124a and 124b are first transferred to columns 104a and 104b, respectively, and then transferred along columns 104a and 104b to the output amplifier 112. Similarly, charges from each of the remaining columns are moved over by one column towards columns 104a and 104b and the transferred to output amplifier 112. The process may repeat until all or substantially all charges are transferred to the output amplifier 112. The output amplifier 112 may be configured to transfer charges and/or signals to a processor 114.

The processor 114 may include microcontrollers and microprocessors programmed to receive data from the output amplifier 112 and exposure values from the exposure circuitry 110, and determine interpolated exposure values for each column in each of the sensors 102a and 102b. Interpolated exposure values are described in more detail with reference to FIGS. 3A-3D. In particular, processor 114 may include a central processing unit (CPU), a memory, and an interconnect bus 606. The CPU may include a single microprocessor or a plurality of microprocessors for configuring the processor 114 as a multi-processor system. The memory may includes a main memory and a read only memory. The processor 114 and/or the databases 116 also includes mass storage devices having, for example, various disk drives, tape drives, FLASH drives, etc. The main memory also includes dynamic random access memory (DRAM) and high-speed cache memory. In operation, the main memory stores at least portions of instructions and data for execution by the CPU.

The mass storage 116 may include one or more magnetic disk or tape drives or optical disk drives, for storing data and instructions for use by the processor 114. At least one component of the mass storage system 116, preferably in the form of a disk drive or tape drive, stores the database used for processing the signals measured from the sensors 102a and 102b. The mass storage system 116 may also include one or more drives for various portable media, such as a floppy disk, a compact disc read only memory (CD-ROM), DVD, or an integrated circuit non-volatile memory adapter (i.e. PC-MCIA adapter) to input and output data and code to and from the processor 114.

The processor 114 may also include one or more input/output interfaces for data communications. The data interface may be a modem, a network card, serial port, bus adapter, or any other suitable data communications mechanism for communicating with one or more local or remote systems. The data interface may provide a relatively high-speed link to a network, such as the Internet. The communication link to the network may be, for example, optical, wired, or wireless (e.g., via satellite or cellular network). Alternatively, the processor 114 may include a mainframe or other type of host computer system capable of communications via the network.

The processor 114 may also include suitable input/output ports or use the interconnect bus for interconnection with other components, a local display 120 and keyboard or the like serving as a local user interface for programming and/or data retrieval purposes.

In certain embodiments, the processor 114 includes circuitry for an analog-to-digital converter and/or a digital-to-analog converter. In such embodiments, the analog-to-digital converter circuitry converts analog signals received at the sensors to digital signals for further processing by the processor 114.

The components contained in the processor 114 are those typically found in imaging systems used for portable use as well as fixed use. In certain embodiments, the processor 114 includes general purpose computer systems used as servers, workstations, personal computers, network terminals, and the like. In fact, these components are intended to represent a broad category of such computer components that are well known in the art. Certain aspects of the invention may relate to the software elements, such as the executable code and database for the server functions of the imaging system 100.

Generally, the methods described herein may be executed on a conventional data processing platform such as an IBM PC-compatible computer running the Windows operating systems, a SUN workstation running a UNIX operating system or another equivalent personal computer or workstation. Alternatively, the data processing system may comprise a dedicated processing system that includes an embedded programmable data processing unit.

The process described herein may also be realized as a software component operating on a conventional data processing system such as a UNIX workstation. In such an embodiment, the process may be implemented as a computer program written in any of several languages well-known to those of ordinary skill in the art, such as (but not limited to) C, C++, FORTRAN, Java or BASIC. The process may also be executed on commonly available clusters of processors, such as Western Scientific Linux clusters, which are able to allow parallel execution of all or some of the steps in the present process.

The method of the present invention may be performed in either hardware, software, or any combination thereof, as those terms are currently known in the art. In particular, the present method may be carried out by software, firmware, or microcode operating on a computer or computers of any type, including preexisting or already-installed image processing facilities capable of supporting any or all of the processor's functions. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

Figure 2:
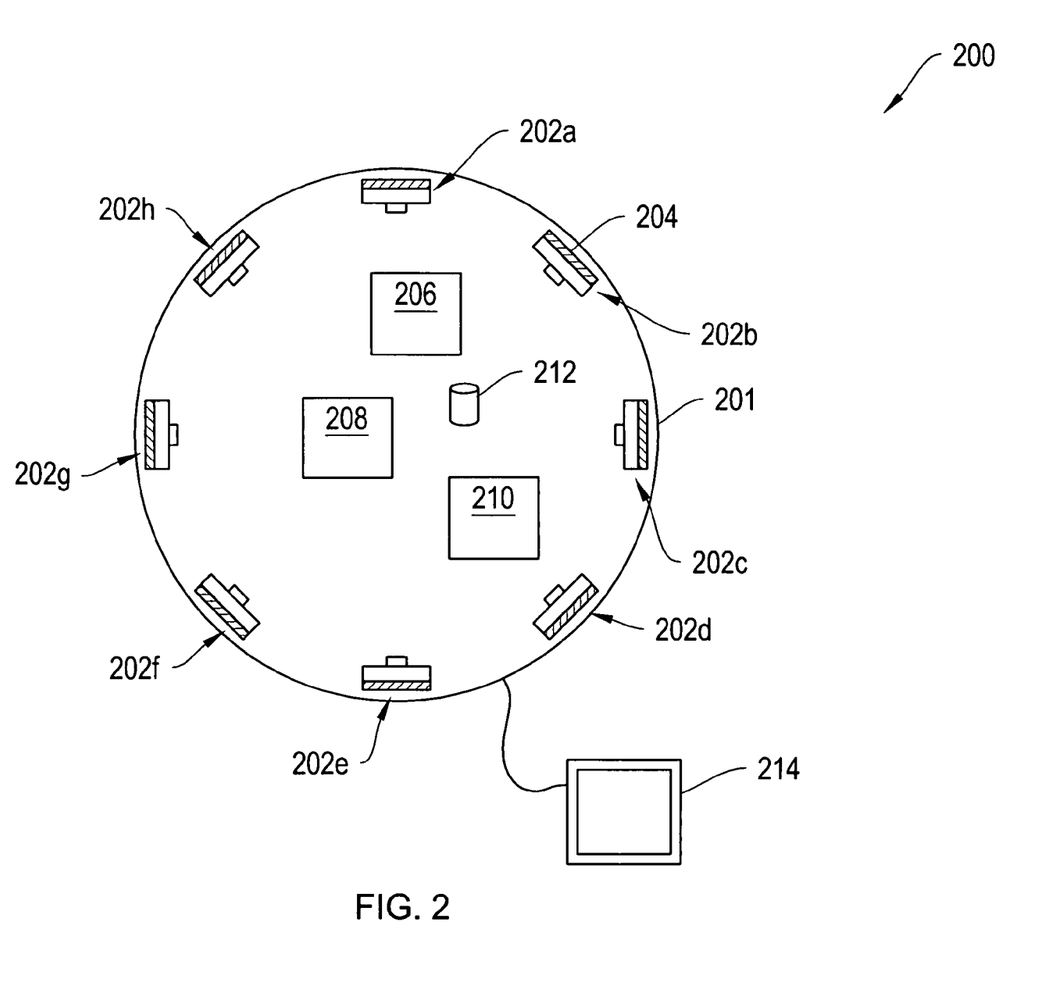
FIG. 2 depicts an imaging system for creating a seamless panoramic view having a plurality of image sensors, according to an illustrative embodiment of the invention.

FIG. 2 depicts an imaging system 200 having a set of multiple sensors mounted on a circular tray where each sensor is directed to capture a portion of a panoramic scene. A panoramic view encompasses a 360-degree view in the horizontal and the vertical planes captured by the image sensors. Each image sensor is exposed to a different amount of light and has a different optimum exposure value that best captures the image, sometimes referred to as a best exposure value. An exposure circuitry 206, similar to exposure circuitry 110, determines and assigns the best exposure value for each sensor when the sensor is capturing an image. In some embodiments, the auto exposure focuses on the center of a field-of-view captured by the respective sensors when determining the best exposure value for the respective sensors.

In some embodiments, images recorded by the sensors, each sensor being exposed to a different amount of light, are aligned next to each other. As a result, when unprocessed images from the multiple sensors are aligned, there exists a discontinuity where the two images meet. The best exposures of the images taken by the sensors are adaptively adjusted to form a seamless 360-degree view.

In particular, FIG. 2 depicts one embodiment of systems 200 described herein where a plurality of sensors 202a-202h, similar to sensors 102a and 102b of FIG. 1, are statically mounted on tray 201, where each sensor is directed to capture a portion of a scene. FIG. 2 also depicts exposure circuitry 206, logic/processor 208, memory 212, multiplexer 210, and display 214. Exposure circuitry 206, coupled to sensors 202a-202h, adjusts the exposure for each sensor, resulting in each sensor recording an image at its best exposure. In some embodiments, the digital signals recorded by sensors 202a-202h are sent to multiplexer 210. Logic/Processor 208 is in communication with multiplexer 210. Logic 208, upon receiving the data signals from sensors 202a-202h, accesses the received data signal and adjusts the exposure of each image recorded by the sensors. Digital signals representing a panoramic view may be stored in memory 212 for further analysis for higher-order pattern or facial recognition. After the exposure for each image is adjusted, a view having images joined in a sequential manner is formed and displayed on display 214. Various methods for adjusting the best exposure values of the images are depicted in FIGS. 3B-3D.

In some embodiments, eight 1.3 megapixel sensors may be mounted on tray 201 having a diameter of 3 inches. The diameter of tray 201 may be larger or smaller depending on the needs. Tray 201 may be sized and shaped to receive a cover. The cover may have clear windows sized and positioned to allow the sensors to capture a panoramic image. Imaging system 200 may be connected to a display (e.g., laptop) through a USB interface.

As noted earlier, generally, when an image is projected to a capacitor array of a CCD sensor, each capacitor accumulates an electric charge proportional to the light intensity at that location of its field-of-view. A control circuit then causes each capacitor to transfer its contents to the adjacent capacitor. The last capacitor in the array transfers its charge into an amplifier that converts the charge into a voltage. By repeating this process for each row of the array, the control circuit converts the entire contents of the array to a varying voltage and stores in a memory.

In some embodiments, the multiple sensors (e.g., sensors 202a-202h) record images as though they were one sensor. A first row of a capacitor array of a first sensor accumulates an electric charge proportional to its field-of-view and a control circuit transfers the contents of each capacitor array to its neighbor. The last capacitor in the array transfers its charge into an amplifier. Instead of moving to a second row of the array, in some embodiments, a micro-controller included in the system causes the first row of the capacitor array of the adjacent sensor (e.g., sensor 202d if the first sensor was sensor 202c) to accumulate an electric charge proportional to its field-of-view.

The micro-controller processor 208 may comprise any of the commercially available micro-controllers. The micro-controllers 208 may execute programs for implementing the image processing functions and the calibration functions, as well as for controlling the individual system, such as image capture operations. Optionally, the micro-controllers can include signal processing functionality for performing the image processing, including image filtering, enhancement and for combining multiple fields of view.

Figure 3A:
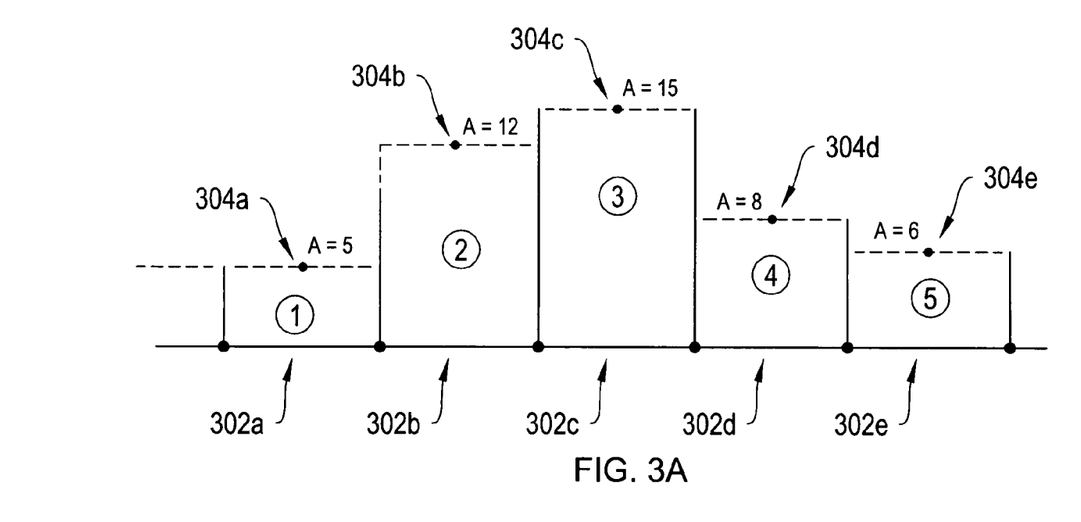
FIG. 3A depicts an a set of unaltered exposure values for multiple image sensors, according to an illustrative embodiment of the invention.
Figure 3B:
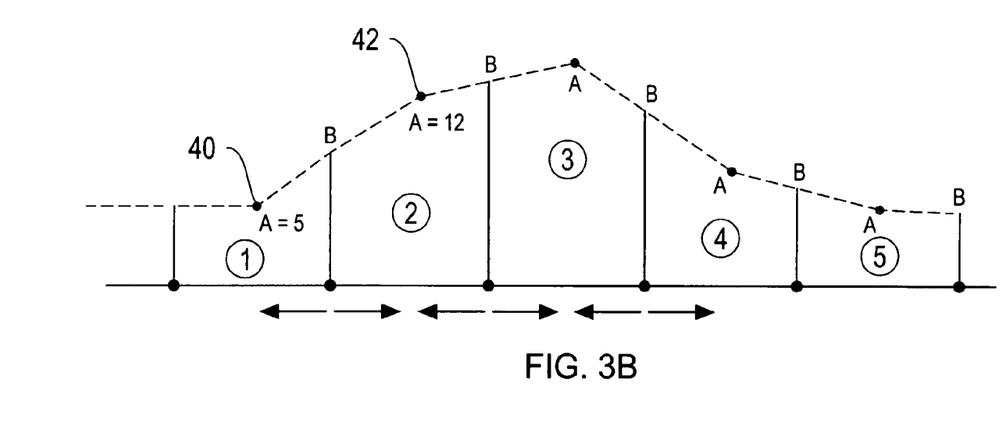
FIGS. 3B-3D depict various methods for adaptively altering the best exposure value of each image, according to illustrative embodiments of the invention.
Figure 3C:
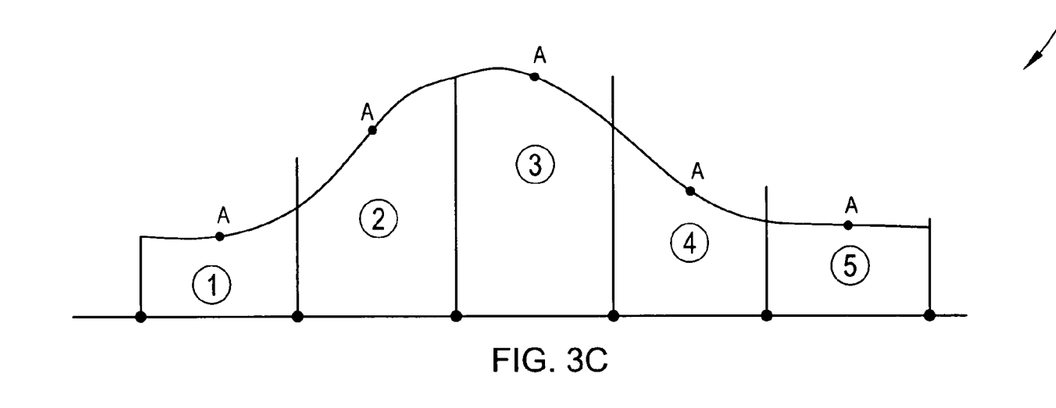
Figure 3D:
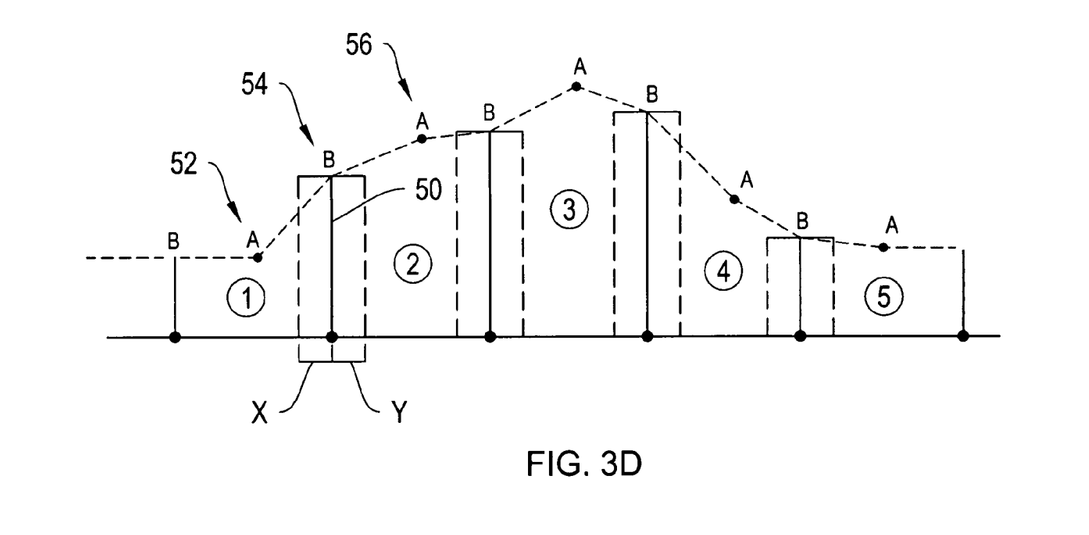

FIG. 3A shows an example 300 of the best exposure values of five image sensors 302a-302e. Points 304a-304e represent the best exposure value for each sensor. For example in FIG. 3A, a best exposure value for frame 1 corresponding to sensor 302a is 5. A best exposure value for frame 2 corresponding to sensor 302b is 12. The images appear truncated without adjusting the exposure of the images. FIGS. 3B-3D depict various methods for adaptively adjusting the best exposure values of the images.

FIG. 3B depicts linear interpolation between the best exposures of each sensor. An optimal exposure for each camera remains in the center of the frame and is linearly adjusted from a center of a frame to a center of an adjacent frame. For example, if frame 1 has a best exposure value of 5 (at point 40) and frame 2 has 12 (at point 42), the exposure values between the two center points (40 and 42) are linearly adjusted to gradually control the brightness of the frames; the exposure values between two center points 40 and 42 starts at 5 and increases up to 12 linearly. With such method, there may be some differences in brightness at the centers of each frame.

FIG. 3C depicts an alternative method for adjusting varying exposure values across the images. Similar to FIG. 2B, an optimal exposure for each camera remains in the center of the frame. In this figure, a spline interpolation between the best exposure values at the centers of the frames is shown, resulting in a panoramic view having less discontinuities or abrupt changes across the images.

FIG. 3D depicts yet another method for adjusting the best exposure value of each sensor. Best exposure values across seams (e.g., seam 50) are averaged. In some embodiments, a fraction of a length of a frame, for example 20% of the frame width, on both sides of a seam may be used to compute the average best exposure value for a seam. The best exposure value at the seam is adjusted to a calculated average best exposure. For example in FIG. 3D, frame 1 has a best exposure value of 5 in zone X and frame 2 has a best exposure value of 11 in zone Y. The average of the best exposure values across seam 50 is 8. The best exposure value at seam 50 is adjusted to 8. The linear interpolation method as depicted in FIG. 3B may be used to linearly adjust the exposure values between point 52 and point 54 and between point 54 and point 56, etc. The result is a more gradual change of brightness from one frame to a next frame. In other embodiments, the spline interpolation method as depicted in FIG. 3C may be used to adjust the best exposure values between the same points (points 52-54).

In certain embodiments, a panoramic window is formed by a plurality of image sensors. Panoramic window may include a center window and steering window. Center window may tell a viewer where the center of the panoramic image is. In some embodiments, the center of a panoramic view is arbitrarily selected reference point which establishes a sense of direction or orientation. A person's ability to interpret a 360-degree view may be limited. Noting the center of a panoramic view helps a viewer to tell whether an image is located to the right or left with respect to a selected reference point.

In some embodiments, a separate screen shows the area enclosed by steering window. The separate screen may be a zoomed window showing a portion of the panoramic image. Steering window may be movable within panoramic window. Zoomed window may show the image contained in steering window at a higher resolution. In this embodiment, a user wanting to get a closer look at a specific area may move the steering window to the area of interest within panoramic window to see get an enlarged view of the area of interest in zoomed window. The zoomed window may have the same pixel count as the panoramic window. In some embodiments, the zoomed window may have higher pixel count than the panoramic window.

The sensor array may be a CCD array of the type commonly used in the industry for generating a digital signal representing an image. The CCD digital output is fed into a multiplexer. In some embodiments, the depicted multiplexer 210 receives data signals from sensors 202a-202h at low and high resolution. The data signal received at a low resolution forms the image shown in the panoramic window. The data signal received at a high resolution is localized and only utilized in the area that a user is interested in. Images selected by a steering window uses the data signal received at a high resolution. The embodiments described herein allow an instant electronic slewing of high-resolution zoom window without moving the sensors.

If the system used 3 megapixel sensors instead of 1.3 megapixel, even with a smaller steering window, the area selected by the steering window shows the selected image at a higher resolution. This image data may be transferred by multiplexer 210 to memory 212. In some embodiments, the image presented in the zoomed window may be stored in a memory for later processing.

Figure 4A:
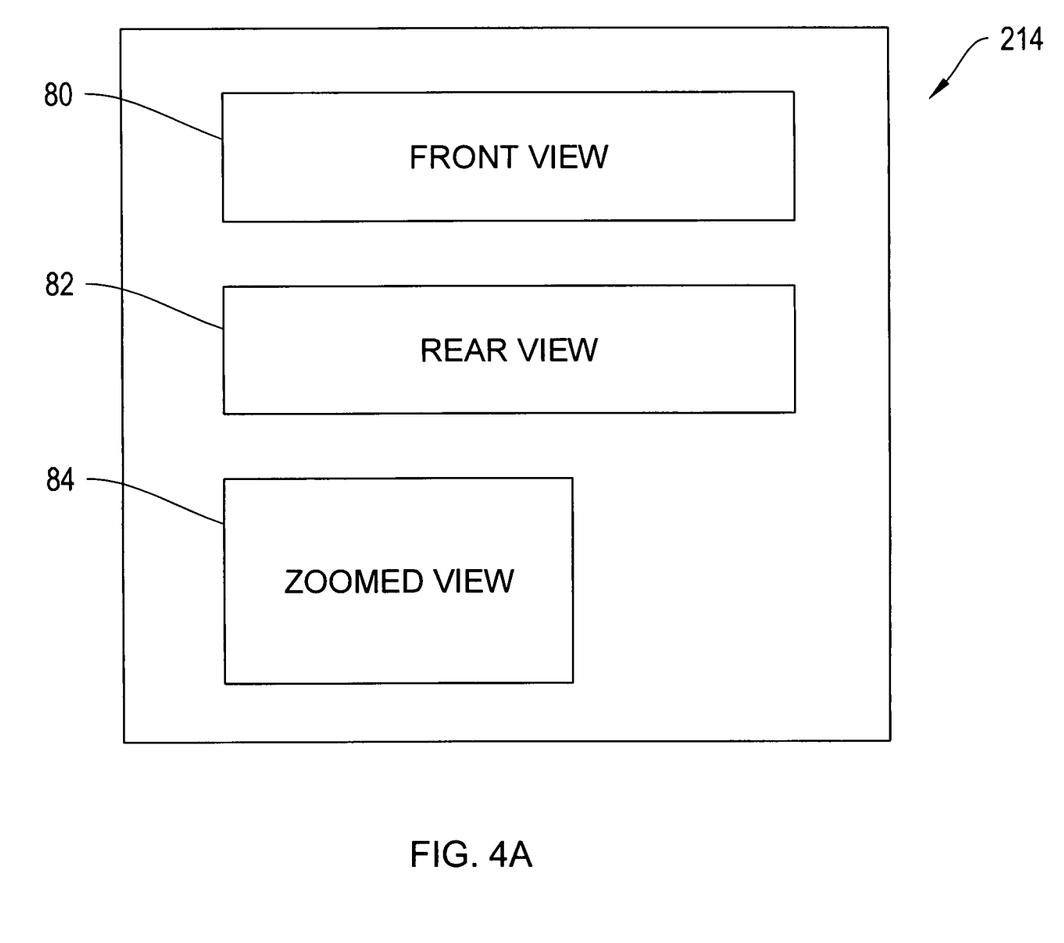
FIG. 4A-4C show various embodiments of a display, according to illustrative embodiments of the invention.
Figure 4B:
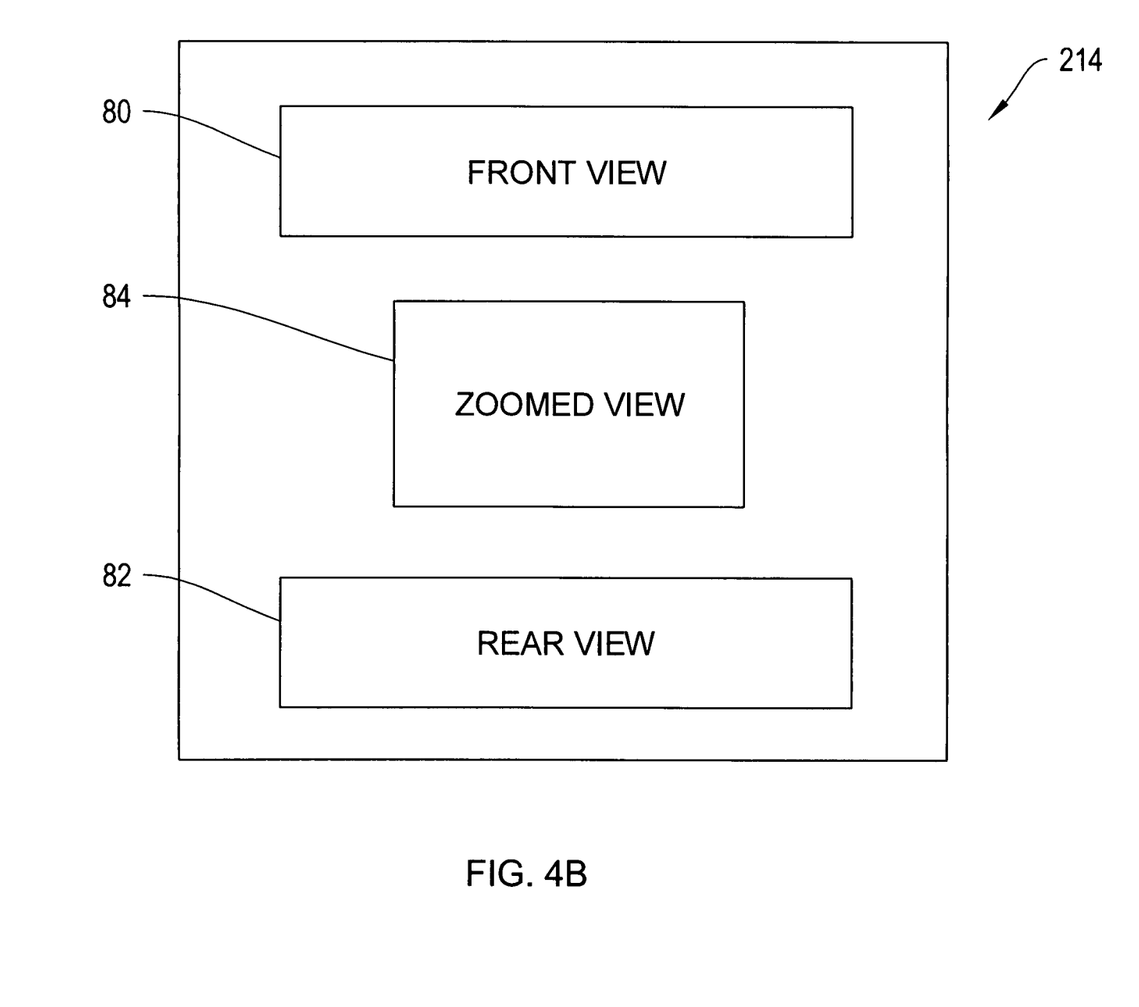

In some embodiments, it may be helpful to split a 360-degree view into two 180-degree views: a front and a rear views. For example, a 360-degree view having 1064×128 pixels may be split into two 532×128 pixel views. FIG. 4A-4B show different embodiments of display 214 (FIG. 2) having three windows: front-view window 80, rear-view window 82, and zoomed window 84. The windows may be arranged in any logical order. In FIG. 4A, the windows are vertically arranged with front-view 80 at the top, rear-view window 82 in the middle, and zoomed window 84 at the bottom. In FIG. 4B, zoomed window 84 may be positioned between front-view window 80 and rear-view window 82.

Figure 4C:
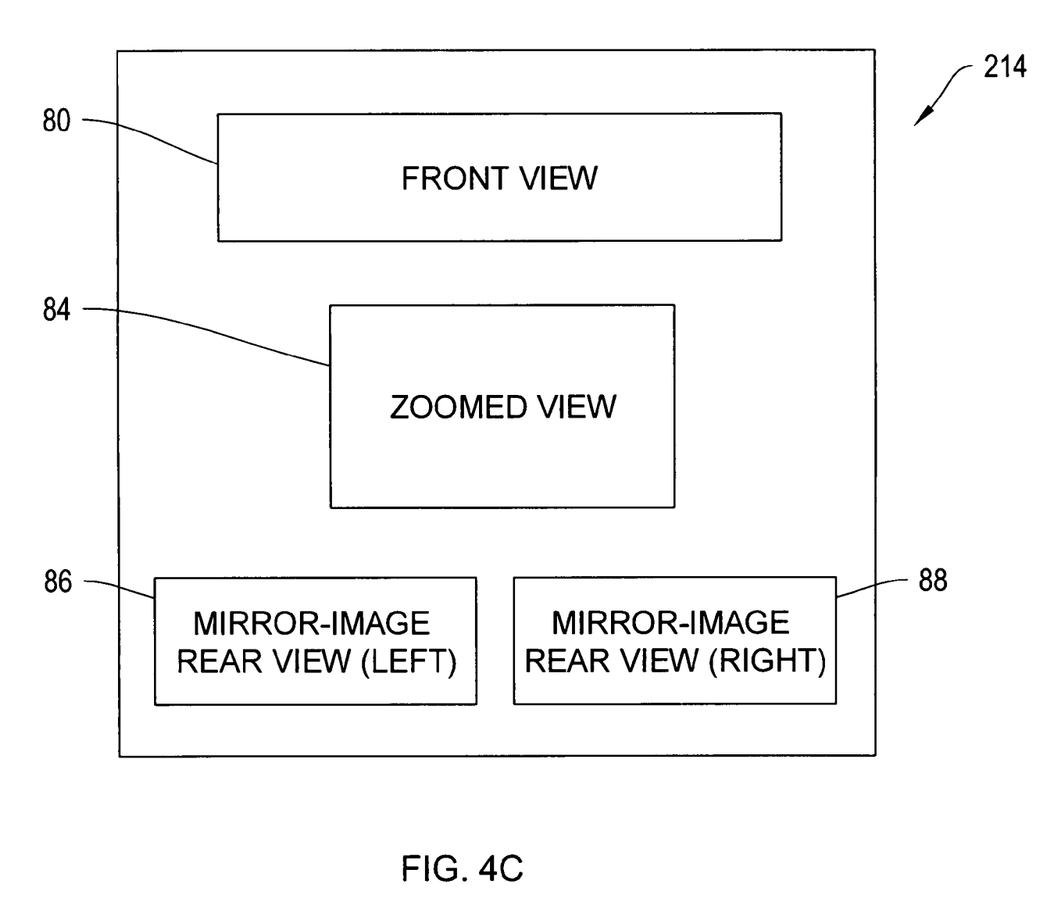

In some embodiments, a mirror image of a rear-view image may be shown in a rear-view window since most people are accustomed to seeing views that they cannot see using mirrors such as a rear-view mirror in a car. FIG. 4C depicts display 214 showing two windows showing mirror-image rear views (86 and 88). In this embodiment, the rear view captured by the image sensors are divided into left and right rear views. However, in other embodiments, the mirror-image rear views may be presented in a single window.

The system described herein provides a constant 360-degree situational awareness. One application of the system may be in the use of a robot. The system may be mounted to a robot. Without human intervention, such robot can scout area of interest. The robot may be sent to monitor a cleared area after military operations. The system may also be able to operate in low-light situations with the use of a set of black and white and non-infrared filtered sensors. The non-infrared filtered sensors may be co-mounted on a tray (e.g., tray 201 in FIG. 2). The system may automatically transition between the non-infrared filtered sensors and the sensors described in FIG. 2. The system may be controlled by a software to switch between the low light and full light settings. With non-infrared sensors, the robot may patrol an area post sun-set.

Those skilled in the art will know or be able to ascertain using no more than routine experimentation, many equivalents to the embodiments and practices described herein. Variations, modifications, and other implementations of what is described may be employed without departing from the spirit and scope of the invention. More specifically, any of the method, system and device features described above or incorporated by reference may be combined with any other suitable method, system or device features disclosed herein or incorporated by reference, and is within the scope of the contemplated inventions. The systems and methods may be embodied in other specific forms without departing from the spirit or essential characteristics thereof. The foregoing embodiments are therefore to be considered in all respects illustrative, rather than limiting of the invention. The teachings of all references cited herein are hereby incorporated by reference in their entirety.

The invention claimed is:

1. A method of imaging a scene, comprising
disposing a first imaging sensor adjacent to a second imaging sensor, each sensor having an array of photosensitive elements for recording a charge in response to incident light;
determining a first exposure value for the first sensor and a second exposure value for the second sensor;
receiving light from the scene at the first and second sensors;
transferring charge collected at each of the photosensitive elements in the first and second sensors to a processor;
modifying the charge collected at one or more of the photosensitive elements based on first and second exposure value, wherein modifying the charge includes determining interpolated exposure values for each column of photosensitive elements in the first and second sensor based on the first and second exposure value, and modifying the charge based on the interpolated exposure values; and
generating an image of the scene based on the modified charge.

2. The method of claim 1, wherein the first imaging sensor is disposed horizontally adjacent to the second imaging sensor.

3. The method of claim 2, wherein charge collected at each of the photosensitive elements in the first sensor are transferred column-wise to a processor beginning with a border column nearest the second sensor.

4. The method of claim 2, wherein charge collected at each of the photosensitive elements in the second sensor are transferred column-wise to a processor beginning with a border column nearest the first sensor.

5. The method of claim 1, wherein the first imaging sensor is disposed vertically adjacent to the second imaging sensor.

6. The method of claim 1, wherein modifying the charge includes generating a signal value based on the charges from the first and second sensors and modifying the signal value based on the first and second exposure value.

7. The method of claim 6, wherein modifying the signal value includes determining an interpolated exposure value based on the first and second exposure value, and modifying the signal value corresponding to each column based on the interpolated exposure value.

8. The method of claim 7, wherein determining the interpolated exposure value includes performing at least one of a linear, spline and cubic interpolation between the first exposure value and the second exposure value.

9. An imaging system, comprising
a first imaging sensor having a plurality of photosensitive elements;
a second imaging sensor having a plurality of photosensitive elements and disposed horizontally adjacent to the first imaging sensor, wherein at least one of the first and second imaging sensors includes a charge-coupled device (CCD) imaging sensor;
an exposure circuitry for determining a first exposure value for the first imaging sensor and a second exposure value for the second imaging sensor, wherein the first and second imaging sensors are oriented such that charges form the first and second sensors are transferred along vertical columns beginning with columns nearest the other one of the sensors; and
a processor configured with circuitry, for
modifying the charge collected at one or more of the photosensitive elements based on first and second exposure value, and
generating an image of the scene based on the modified charge.

10. The imaging system of claim 9, further comprising one or more additional imaging sensors having a plurality of photosensitive elements and disposed adjacent to at least one of the first or second imaging sensors, an exposure circuitry for determining one or more additional exposure values for the one or more imaging sensors, and a processor configured with circuitry for modifying the charge collected at one or more of the photosensitive elements based on at least two of the first, the second, and the one or more additional exposure values.

11. The imaging system of claim 10, wherein the one or more additional imaging sensors and the first and second imaging sensors are positioned in a closed circle having a combined field-of-view of about 360 degrees.

12. The imaging system of claim 10, wherein the one or more additional imaging sensors and the first and second imaging sensors are positioned in a semi-circle having a combined field-of-view of about 180 degrees.

13. The imaging system of claim 9, wherein at least one of the first and second imaging sensor includes a complimentary metal-oxide semiconductor (CMOS) imaging sensor.

14. A method of generating a digital image of a scene, comprising
disposing a first charge-coupled device image sensor adjacent to a second charge-coupled device image sensor, each sensor having rows and columns of photosensitive elements, such that the first sensor borders the second sensor along a direction parallel to the columns of each sensor;
recording an image using the sensors, including the steps of
exposing, at a first exposure value, the first sensor to light from the scene,
exposing, at a second exposure value, the second sensor to light from the scene, and
determining an interpolated exposure value for the photosensitive elements in each column of each sensor based on the first and second exposure values, and
generating a signal value by transferring charge accumulated at the photosensitive elements in each sensor, column-wise to an output amplifier;
modifying the signal value for each column based on the interpolated exposure value; and
generating an image based corresponding to the scene based on the modified signal value.

15. The method of claim 14, wherein transferring charge column-wise includes
transferring, to a processor, charge from photosensitive elements in a border column on the first sensor nearest to the second sensor, and charge from photosensitive elements in a border column on the second sensor nearest to the first sensor;
transferring, to the processor, charge from the remaining columns in the first sensor sequentially away from the border column on the first sensor; and transferring, to the processor, charge from the remaining columns in the second sensor sequentially away from the border column on the second sensor.

16. The method of claim 14, wherein an interpolated exposure value of the column in the first sensor, nearest to the second sensor is substantially the same as an interpolated exposure value of the column in the second sensor, nearest to the first sensor.

17. The method of claim 14, wherein one or more interpolated exposure values are calculated based on a linear interpolation between the first and second exposure values.

18. The methods of claim 14, wherein one or more interpolated exposure values are calculated based on a spline interpolation between the first and second exposure values.

19. The method of claim 14, wherein at least one column in the first sensor has an exposure value equal to the first exposure value and at least one column in the second sensor has an exposure value equal to the second exposure value.

20. The method of claim 14, further comprising disposing one or more additional charge-coupled device imaging sensors adjacent to at least one of the first and second sensor.

21. The method of claim 20, wherein recording the image includes exposing the one or more additional sensor at an third exposure value and determining interpolated exposure values for columns between the one or more additional sensors and the first and second sensors based on the first, second and third exposure values.

22. An imaging system, comprising
a first charge-coupled device imaging sensor positioned adjacent to a second charge-coupled device imaging sensor, each sensor having rows and columns of photosensitive elements;
exposure circuitry connected to the first and second sensor and configured to determine a first exposure value for the first sensor and a second exposure value for the second sensor; and
a processor, for receiving a charge from each of the photosensitive elements in the first and second sensors, and having circuitry configured for
calculating interpolated exposure values for each column of photosensitive elements on each sensor based on the first and second exposure value,
receiving charges from photosensitive elements in each sensor along a first column nearest to the other one of the sensors,
receiving charges from the photosensitive elements in remaining columns in each sensor along a direction away from the other sensor,
modifying the received charges based on the interpolated exposure values, and
generating an image based on the modified charge.

* * * * *